US012566719B1

(12) United States Patent

Muskatblit et al.

(10) Patent No.: US 12,566,719 B1

(45) Date of Patent: Mar. 3, 2026

(54) LOW LATENCY IN-LINE NETWORK COMPUTE PLATFORM

(71) Applicant: Morgan Stanley Services Group Inc., New York, NY (US)

(72) Inventors: Igor G. Muskatblit, Mountain View, CA (US); Michael Gorbovitski, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/032,967

(22) Filed: Jan. 21, 2025

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 7,447,197 | B2 * | 11/2008 | Terrell ................ | H04L 67/1097 |
| | | | | 370/360 |
| 8,519,739 | B1 | 8/2013 | Leon | |
| 10,512,417 | B2 * | 12/2019 | Hannemann ......... | G01R 33/283 |
| 10,572,417 | B2 * | 2/2020 | Pope ..................... | G06F 13/362 |
| 11,159,386 | B2 * | 10/2021 | Finn, II ................ | H04L 43/045 |
| 11,204,747 | B1 | 12/2021 | Zejda et al. | |
| 11,425,230 | B2 * | 8/2022 | Mula ....................... | H04L 69/12 |
| 11,711,453 | B2 * | 7/2023 | Levy ..................... | H04L 69/324 |
| | | | | 709/224 |
| 12,007,915 | B1 * | 6/2024 | Muskatblit .......... | G06F 13/1668 |
| 2009/0217266 | A1 * | 8/2009 | Krishnamurthy ....... | H04L 65/65 |
| | | | | 718/100 |
| 2010/0217967 | A1 | 8/2010 | Viswanathan et al. | |
| 2016/0173104 | A1 | 6/2016 | Vassiliev | |
| 2017/0220499 | A1 | 8/2017 | Gray | |
| 2018/0139110 | A1 | 5/2018 | Johnson et al. | |
| 2018/0287964 | A1 | 10/2018 | Gray | |
| 2019/0199654 | A1 | 6/2019 | Pope et al. | |
| 2019/0266089 | A1 | 8/2019 | Kumar | |
| 2023/0344894 | A1 * | 10/2023 | Balle ....................... | H04L 67/02 |

* cited by examiner

*Primary Examiner* — Elias Mamo
(74) *Attorney, Agent, or Firm* — Leason Ellis LLP

(57) ABSTRACT

A data processing system and method include an in-line network compute platform. A network interface controller receives, via a plurality of receiving pathways, data across a data communication network. The network interface controller performs inspection of the received data and identifies respective endpoint nodes to receive at least some of the received data, wherein the endpoint nodes are comprised in a parallel compute array. The network interface controller parses, as a function of the respective endpoint nodes, the at least some of the received data and normalizes, as a function of the respective endpoint nodes, the parsed at least some of the received data. Further the network interface controller routes the normalized, parsed at least some of the data from the network path panel to the respective endpoint nodes within the parallel array. The network interface controller and the parallel compute array are comprised in the in-line network compute platform.

17 Claims, 4 Drawing Sheets

402 START

404 RECEIVE DATA STREAM VIA NETWORK PATH PANEL

406 INSPECT AND PARSE DATA

408 EXECUTE DATA ARBITRATION

410 TRANSMIT NORMALIZED DATA TO NODES

412 RECEIVE PROCESSED DATA FROM NODE

414 EXECUTE RESPONSE ARBITRATION

416 GENERATE RESPONSES

418 TRANSMIT GENERATED RESPONSES

420 END

LOW LATENCY IN-LINE NETWORK COMPUTE PLATFORM

FIELD

The present disclosure relates, generally, to data transmissions and, more particularly, to a flexible and scalable reduced latency architecture connecting requesting devices to transmitting devices.

BACKGROUND

Classical data center applications rely heavily on a common architecture to achieve network connectivity along with data processing. This architecture typically includes a field programmable gate array ("FPGA") network interface controller ("NIC") that is directly connected to a network, and a number of CPUs plus peripherals and accelerators connected to this FPGA over a high-speed serial bus network on the motherboard.

In this kind of architecture, the FPGA connects to an external network and performs basic data structuring on any data received from this external network. The FPGA then outputs this data to an internal facing PCIe network, typically consisting of a few CPUs and other accelerators that exist to process the data. Following computation of the data from the FPGA, servers then send meaningful "information of interest" back to the FPGA via the internal PCIe network. Once the FPGA receives this data, the FPGA may then send an output back to the external network to affect some action.

In an architecture like this, the FPGA can be thought of as the interface between the external network (for example, a stock exchange), and an internal network such as a PCIe network of CPUs for computation. Such internal network can perform distributed computation, based on the data from the external network.

A key benefit of this type of architecture is flexibility. The FPGA can be adapted to perform various parsing and data structuring, providing a unified/normalized interface to an internal network, regardless of the type of external network. The downside of this architecture, however, is the inherent latency of the internal network. Increasingly, applications require decisions to be made on data much more quickly, and thus the latency in passing data to a large internal compute network is becoming unacceptable.

In essence, requiring higher compute ability while retaining low latency (sub-100 ns stimulus-to-response) is not possible with the current architecture. Note that in such a system the engineer typically has no control over the external network, but has full control over the internal network. Thus, this invention is focused solely on optimizing the internal network. In order to do higher and higher compute with ultra-low latencies ("ULL"), such as supporting sub 100 ns responses to network stimulus, current designs are limited to FPGAs or SW running on CPU. Unfortunately, such solutions are complicated, slow, and risky to undertake as compute complexity is limited to FPGA resources.

It is with respect to these and other considerations that the disclosure made herein is presented.

BRIEF SUMMARY

In one or more implementations, the present disclosure includes an in-line network compute platform. A connection interface is coupled to a network path panel, wherein the network path panel is configured to send and receive data across a data communication network. Further, a plurality of data receiving pathways are provided, wherein data from the network path panel are received via the connection interface and transmitted across the plurality of receiving pathways. A network interface controller is configured to receive, from each of the plurality of receiving pathways, the data from the network path panel. Moreover, a parallel compute array of respective endpoint nodes is provided. The network interface controller is further configured to perform inspection of the data received via the plurality of receiving pathways. Further, as a function of the inspection, the network interface controller is configured to identify the respective endpoint nodes within the parallel compute array to receive at least some of the data from the network path panel. The network interface controller is further configured to parse, as a function of the respective endpoint nodes, the at least some of the data from the network path panel and to normalize, as a function of the respective endpoint nodes, the parsed at least some of the data from the network path panel. The network interface controller is further configured to route the normalized, parsed at least some of the data from the network path panel to the respective endpoint nodes within the parallel array.

In one or more implementations, a data processing method is disclosed including an in-line network compute platform. A network interface controller receives, via a connection interface coupled to a network path panel and a plurality of receiving pathways, data across a data communication network. The network interface controller performs inspection of the received data and identifies, as a function of the inspection, respective endpoint nodes to receive at least some of the received data, wherein the endpoint nodes are comprised in a parallel compute array. The network interface controller parses, as a function of the respective endpoint nodes, the at least some of the received data and normalizes, as a function of the respective endpoint nodes, the parsed at least some of the received data. Further the network interface controller routes the normalized, parsed at least some of the data from the network path panel to the respective endpoint nodes within the parallel array. The network interface controller and the parallel compute array are comprised in the in-line network compute platform.

In one or more implementations, the network interface controller is further configured to: receive, from the respective endpoint notes, respective response data; perform inspection of the response data identify, as a function of the inspection of the response data, respective computing devices to receive at least some of the response data; and build, as a function of response arbitration data, responses for the respective computing devices, wherein the responses include at least some of the response data.

In one or more implementations, the in-line network compute platform further comprises a plurality of data transmission pathways, wherein the network interface controller routes the responses across the plurality of data transmission pathways to the respective computing devices via the connection interface and the network path panel.

In one or more implementations, the in-line network compute platform further comprises at least one replicator configured to replicate the data received via the connection interface from the network path panel and to the network interface controller via the plurality of receiving pathways.

In one or more implementations, the endpoint nodes are respectively configured with programming instructions for data processing operations.

In one or more implementations, at least some of the response data is forwarded to at least one other computing device.

In one or more implementations, the in-line network compute platform further comprises at least one second in-line compute platform, wherein the in-line compute platform and the at least one second in-line compute platform are coupled via a chip-to-chip connection.

In one or more implementations, the in-line network compute platform further comprises a first plurality of network ports configured for receiving some of the data for the in-line compute platform and a second plurality of network ports configured for receiving some other of the data for the at least one second in-line compute platform.

In one or more implementations, the in-line network compute platform further comprises wherein the network interface controller is a field programmable gate array or a specialized smart network interface controller application specific integrated circuit.

These and other features are set forth herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
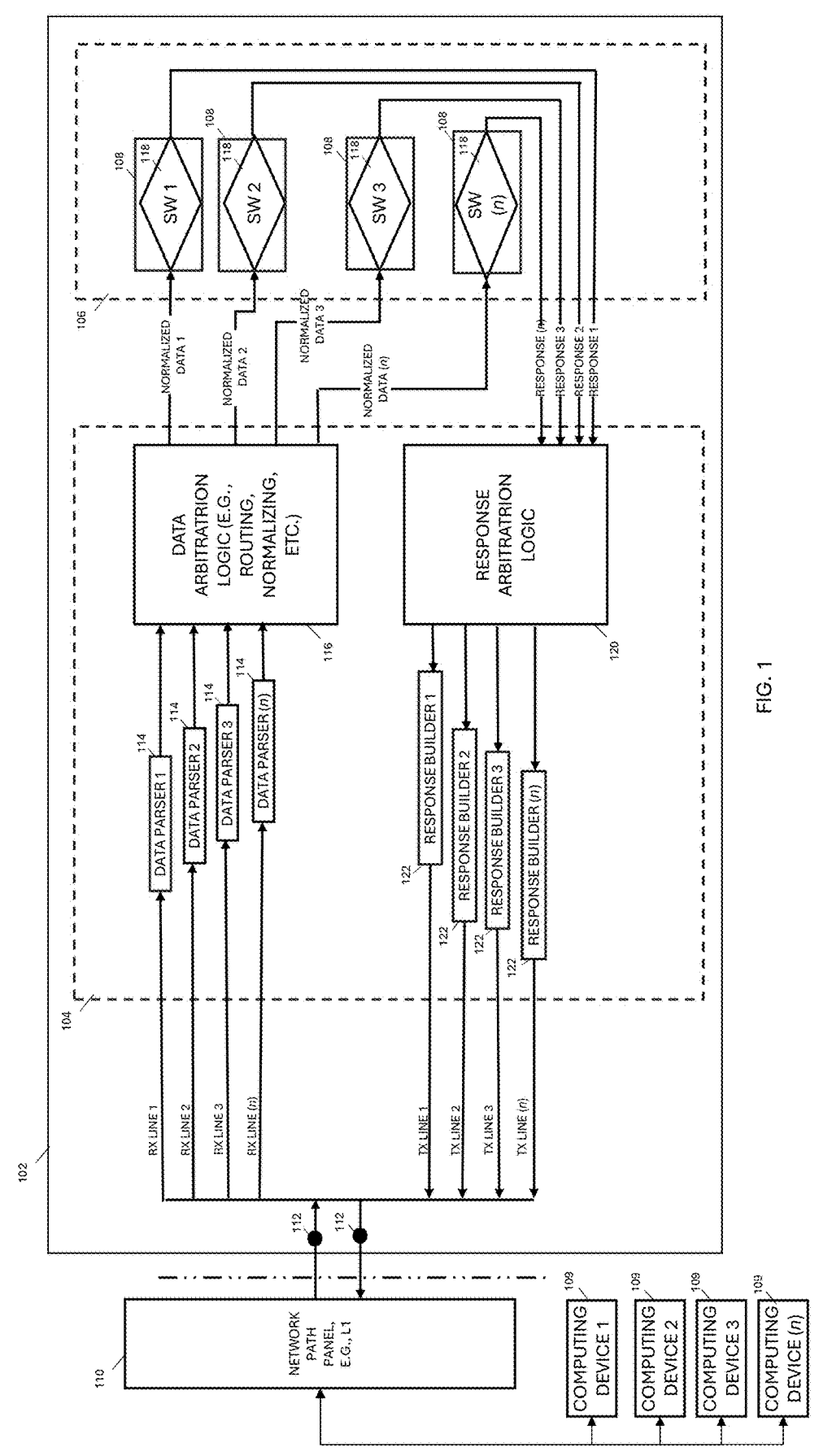
FIG. 1 shows an example system architecture, in accordance with an example implementation of the present disclosure.

The present disclosure provides systems and methods for a low latency, in-line network compute platform. A new compute architecture is provided that effectively supplants a traditional internal network, as a function of a localized parallel compute arrays comprising nodes that are situated physically close to a FPGA. Effectively, the architecture can be configured to be mobile and move compute directly on to a network, for example, using a FPGA to interface and reduce overall latency associated with responding to events from a network. As used herein, the term "compute" refers, generally, to hardware and/or software that can be configured for computational activity. Compute can include electronics, such as integrated circuits, discrete components, packages, and other semiconductor technologies, that can be arranged for computational activity, including processing units, memory, interfaces (e.g., network interfaces), other suitable devices, as well as one or more combinations thereof, such as provided in a server computing device. Further, compute can include software that operates with or in connection with electronics, which contributes to computational activity. Accordingly, a new architecture is disclosed that moves compute directly on to a network using an FPGA to interface and reduce overall latency of responding to events from a network, effectively creating an ULL in-line compute platform. The present disclosure presents a method to allow compute to be in line or "in the network," effectively turning the network as a compute plane, removing the need for all data to travel to the servers CPU consuming power and time.

In one or more example implementations of the present disclosure, a FPGA or other integrated circuit that can be configured, such as by executing programming statements, and that can be integrated in a smart NIC interface for, for example, passing information to a parallel processing array of nodes. As noted herein, it is preferable for the integration be configured for physical placement in close proximity with a server. The server can contain a network of nodes, for example, that are connected using a chip-to-chip protocol. Implementations can include nodes, such as a central processing units ("CPUs"), graphic graphics processing units ("GPUs"), inference chips, or other compute devices, and computer software residing within the network of compute nodes. The FPGA can be configured to operate as a NIC interface, thereby providing for rapid flow of information, including as a function of the close proximity of the nodes to each other and to the FPGA. This provides for unprecedented latency reduction and, correspondingly, lower response times to various stimuli associated with the external network. Moreover, in one or more implementations, the architecture can be configured as a single integrated circuit chip comprising a parallel system, in which the FPGA acts an internal NIC interface, for improved flow of information there-through.

In one or more implementations of the present disclosure, the FPGA and the parallel compute platform are configured together (e.g., they can be integrated or "sit" together) to create a single in-line or in-network ULL compute platform. This approach is distinct from traditional approaches that move data overlong distances to compute units, which can sit in separate servers. Any possible limitations of the present disclosure with regard to a lower scalability compared, for example, to a traditional approach, is well compensated for by highly reduced latency. FPGAs are recognized herein as being particularly usable in implementations of the present disclosure for connecting nodes together, for example, or for providing dynamic connectivity and configuring of nodes. Adaptable compute fabrics within an SOC design, including via a FPGA, are recognized herein for being particularly useful for providing flexible connectivity, as well as for contributing to mobilizing the parallel processing array by performing high-speed input/output ("I/O") processing on received data, such as normalizing the data or performing other data processes before provisioning the data to a parallel processing array. In one or more alternative implementations, an application specific integrated circuit ("ASIC") comprising a smart NIC can be substituted for an FPGA, which passes data to the parallel processing array thereby allowing data to flow through, as necessary.

An architecture in accordance with one or more implementations of the present disclosure can include a NIC architecture and a data processing architecture, in which the NIC architecture handles the networking, including movement of the data, and the data processing operates on the data in parallel. Computing is physically provided on the data path and, as data are transmitted, computing processes can be performed to structure data, change data, create data events, or perform other data processes within the architecture and, preferably, not at an endpoint node. In this way, the architecture, including in some implementations a FPGA, improves computing technology by acting not merely as an accelerator, such as in traditional systems, but rather as part of an autonomous parallel architecture. The technology shown and described herein analyzes data without queueing or serialization, including by physically locating the devices as close as possible in a network compute architecture that is configured to receive and process data in parallel.

Accordingly, the present disclosure provides in-network-software ("INSW") compute platform systems that can be deliver at scale, sitting on the edge. Using ULL FPGAs as the interface to the network (e.g., exchange), parsing and structuring the interaction with the network, including to handle protocol and data formats, can be performed and network events handled in 10, 50, 100 and 250+ nanosecond ("NS") envelopes. Parsing logic can be implemented to identify data received over a respective stream, such as to identify what the data are, where the data should be routed, or the like. In one or more implementations, a FPGA operate as a NIC interface and can be connected through a bidirectional ULL chip-to-chip ("C2C") connection to a deterministic compute engine, such as one or more of a graphics processing unit ("GPU"), an inference chip, a parallel compute array, or other suitable engine. Data can be used in the compute as the data flow through the network, from one compute location to another compute location for further processing, with extremely low latency, or used to enhance the current understanding of the state of the system. For example, compute software can reside with the deterministic compute engine for handling complex algorithms, such as relating to inference or processing information, including in large look-up tables ("LUT"), for various operations. In such implementation(s), two chips, including the FPGA and the compute engine, for example, can be configured as a PCIe card with 16 to 32 exchange facing ports. The front adaptable FPGA can be used for network-specific interaction and can adapt to different line rates, different network interfaces, and different architectures. Further, a back-end can use a high bandwidth distribution plane to scale compute plane to multiple hosts within the server and/or racks.

Referring now to the drawings, in which like reference numerals refer to like elements, FIG. 1 illustrates an example low latency, in-line network compute platform architecture 102, in accordance with an example implementation of the present disclosure. An architecture in accordance with the present disclosure includes a Smart NIC interface capable of smart routing, parsing and/or structuring data without adding latency, in other words without using memory. In the example shown in FIG. 1, platform 102 includes NIC interface 104, which can include a FPGA, an ASIC, or other suitable integrated circuit. Further, a parallel compute array 106 is included with platform 102, which is usable to avoid buffering of data processing. Array 106 can include nodes 108 such as, for example, GPUs, inference chips, or other suitable processors. Parallel array 106 can operate as a deterministic compute engine and configured, for example, with a GPU, an inference chip, or a plurality of integrated circuits in a parallel compute array, and execute complex algorithms, inference procedures, or reference large look-up tables ("LUT") for various processes in accordance with respective implementations.

Continuing with reference to FIG. 1, computing devices 109 are shown which send and receive data via network path panel 110. Network path panel 110 can be, for example, a layer 1 ("L1") switch, but can be configured as a L2, L3 or other suitable device, in accordance with particular implementations. Data can be transmitted from computing devices 109 via panel 110 can be replicated, such as via replicator 112, and transmitted via each of a plurality of data pathways, such as RX lines 1-n. In addition, information received via the RX lines can be processed, such as inspected for determining a respective endpoint within the parallel array 106. Other processing can be performed, such as parsing data on the respective RX lines via a data parser 114. In addition, data arbitration logic 116 can be provided via NIC interface. For example, routing to respective endpoints, normalizing data for processing in parallel array 106. Software processes 118 can act on respectively normalized data and response data 1-n transmitted to NIC interface 104. Thereafter, response arbitration logic 120 can operate on the respective response data 1-n, including via response builders 122 1-n, to inspect the response data for preparing appropriate responses, and routing responses, such as via TX lines 1-n, to respective computing devices 109. For example, response arbitration logic 120 can include determining respective ones of computing devices 109 to receive a response, normalizing the respective responses 1-n, and routing building respective responses 122 for each of the computing devices 109. Of course, one of ordinary skill will recognize that other implementations are supported by the present disclosure, and that design variations beyond the arrangement shown in FIG. 1 are supported herein.

Figure 2:
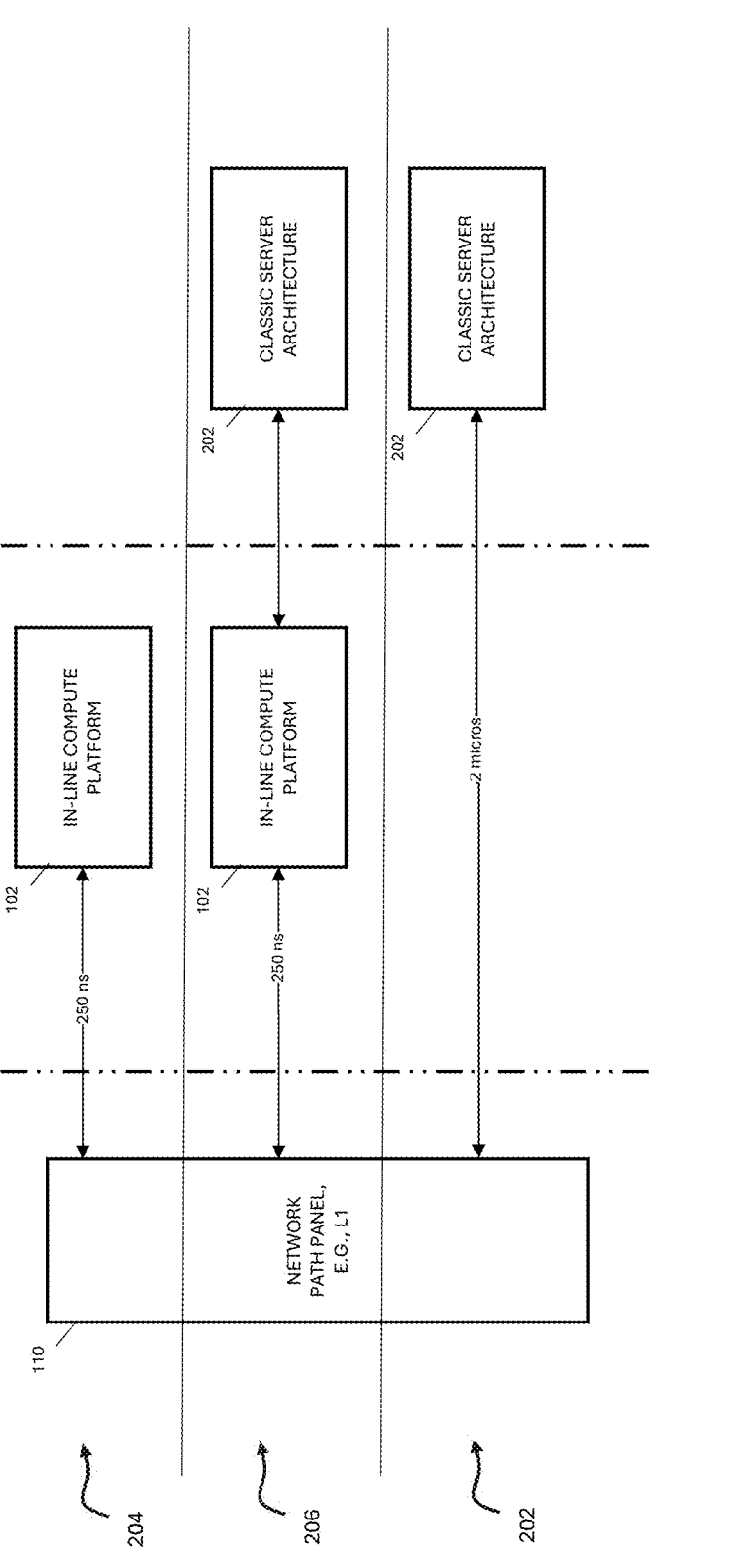
FIG. 2 is a high-level diagram illustrating three respective arrangements, including two arrangements including implementations of the present disclosure.

FIG. 2 is a high-level diagram illustrating three respective arrangements 202, 204, and 206, each with example latency performance. Arrangement 202 shows a classic arrangement without inline compute platform 102, in which a server responds to data transmissions over a network directly from network path panel 110. In the example arrangement 202, transmission from network path panel 110 to classic server architecture requires a minimum of two (2) microseconds (ms) for data to be received and handled by the classic server architecture. In the alternative arrangement 204 illustrated in FIG. 2, inline compute platform 102 is included and receive and handles data transmitted via network path panel 110, such as shown and described above with regard to FIG. 1. In the arrangement 204, the inline compute platform 102 responds with significantly less latency, for example, within 250 ns. In the arrangement 206 illustrated in FIG. 2, additional processing not provided by inline compute platform 102 is provided, as data processed by platform 102 flow through to a classic server architecture 202. As in arrangement 204, data can be received and handled by inline compute platform 102 significantly faster (i.e., by incurring significantly less latency) than directly by classic server architecture 202 (arrangement 202). Thus, the respective example arrangements illustrated in FIG. 2 represent the significant performance benefits provided by the present disclosure that are otherwise unavailable. In arrangement 202, for example, the software executing on the server CP is interconnected through, for example, PCIe. In such arrangement, data from the network are delivered to the server's CPU system memory in advance of compute operations and a response sent back. In arrangements 204 and 206, in contrast, the software compute plane interacts with the network and/or servers autonomously, without a need to move data beyond this point and incurring 250 ns or less of latency, as opposed, for example, to 2 ms of latency.

In one or more implementations, a patch panels located at the top of a rack can include a switch acting as a firewall and uses rules for data flowing through the network, including what is allowed to pass through the firewall, and activity can be handled, such as to prevent further transmissions, to generate and send a message associated with one or more firewall rules that affect the flow of data.

Figure 3:
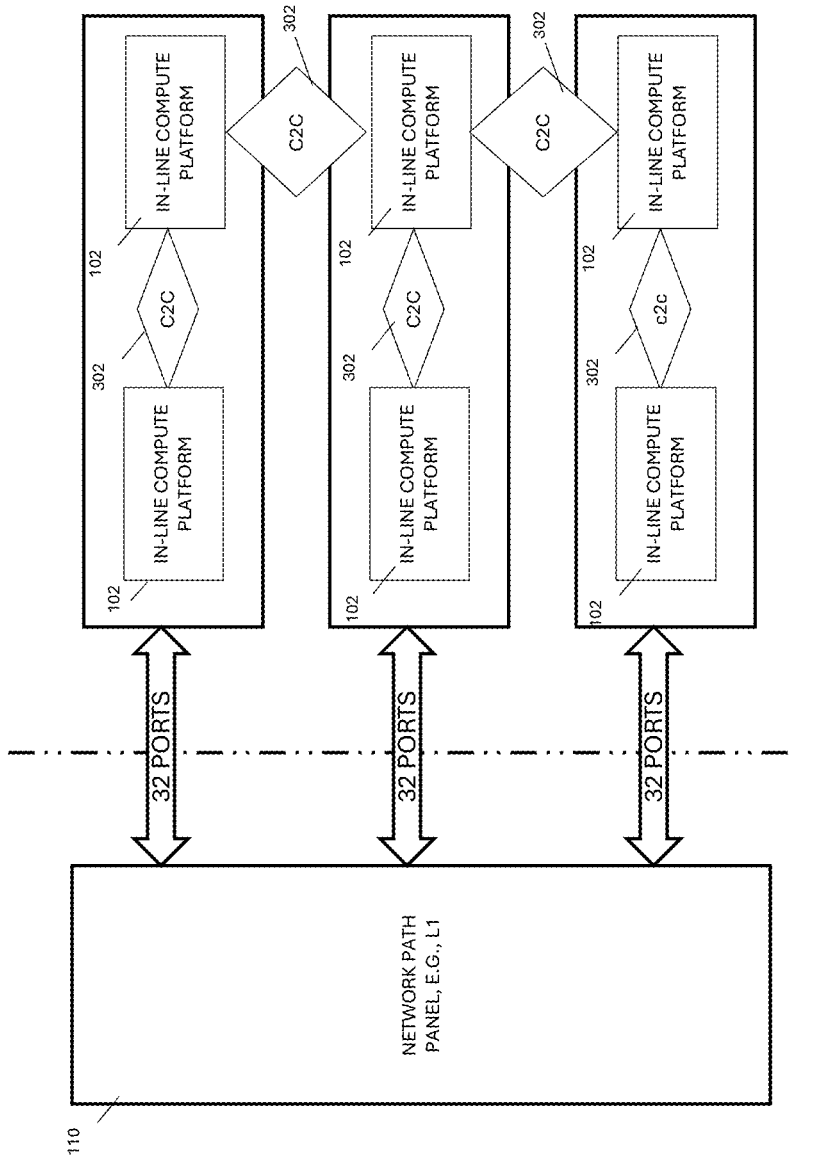
FIG. 3 illustrates an example enhanced implementation of the present disclosure, in which illustrates the ability to scale to support various technical environments.

FIG. 3 illustrates an example enhanced implementation of the present disclosure, in which illustrates the ability to scale to support, for example, 32 ports, 64 ports, 128 ports, or more, all supporting parallel processing and keeping up with high bandwidth demands, such as in the enterprise. The data can move in multiple planes, thereby supporting the performance benefits shown and described herein in complex and technically demanding environments. Without inline compute platform 102, a GPU or other suitable integrated circuit would be required just, for example, for checking a handful of firewall rules for network traffic, thereby incurring power and device demands, as well as increased latency.

Continuing with reference to the example implementation illustrated in FIG. 3, systems supporting inline compute platform 102 can deliver at scale including with regard to placement in a network. Using, for example, an ultra-low latency FPGAs in connection with NIC interface 104 to the network (e.g., exchange), parsing and structuring interactions with the network, including to inspect, assess, and process data as a function of particular data protocols and data formats, and for responding to network events in 10, 50, 100 and 250+ ns envelops. As illustrated in FIG. 3, the NIC interface 104 can be connected via a bidirectional ultra-low latency chip-to-chip ("ULL C2C") connection to the parallel array 104. The front adaptable NIC interface 104 (e.g., a FPGA) is usable for handling with network-specific interactivity, such as being adaptable for different line rates, network interfaces and architectures. Thereafter, parallel array 106, effectively acting as a back-end infrastructure, can use the high bandwidth distribution plane to scale compute plane to multiple hosts effectively forming an in-network compute mesh. Thus, and as illustrated in the drawings, data are transmitted over correct ports and, as illustrated in FIG. 3, data can move in multiple planes.

Figure 4:
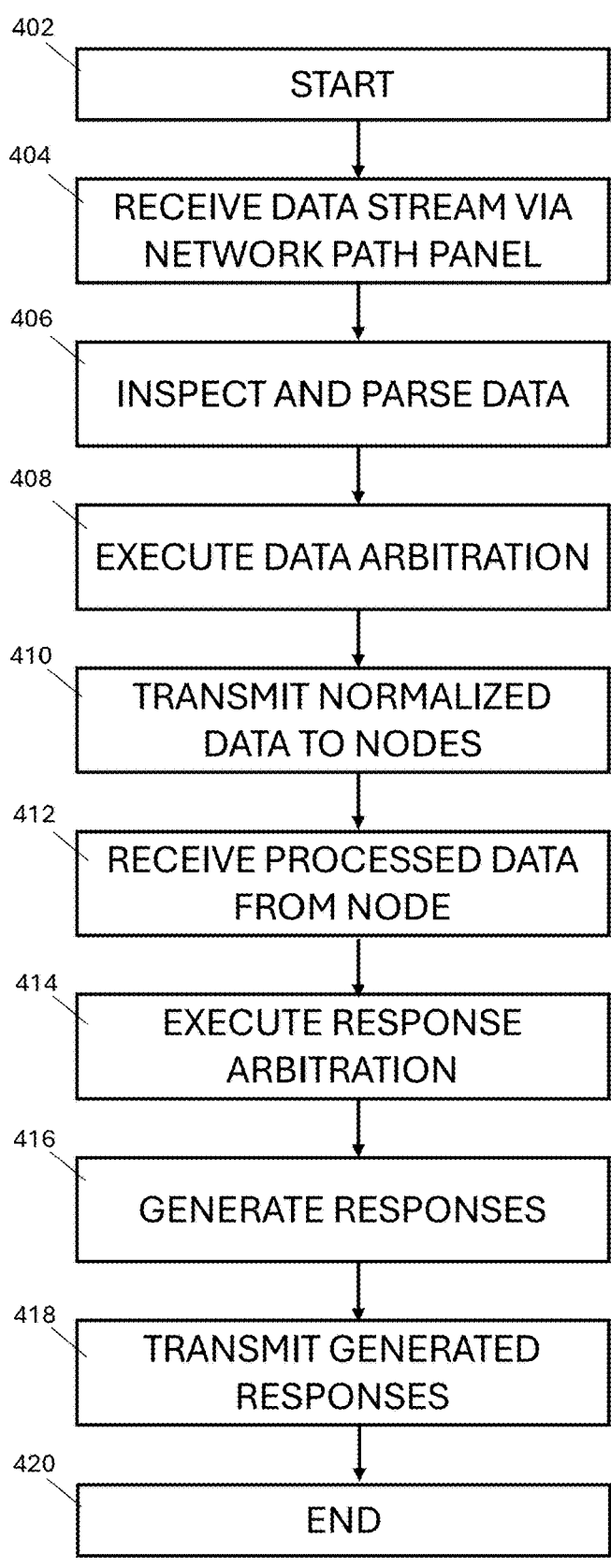
FIG. 4 is a high-level flow diagram illustrating steps associated with an example implementation of the present disclosure.

FIG. 4 illustrates a flowchart illustrating steps in connection with an example implementation of the present disclosure. At step 402, the process starts and, thereafter, one or more data streams are received via network path panel a device 108 (step 404). Data can be received over each of a plurality of RX lines. Thereafter, data inspection and parsing operations are performed for data received over each of the respective RX lines (step 406). For example, data received over a respective RX line are inspected to determine a particular protocol, to identify a particular endpoint (e.g., within parallel array 106), to determine parsing operations for the data, or other suitable operations. Further, data parsing operations can be performed, for example, for further processing by NIC interface 104 and for processing to be performed by endpoint nodes 108 in parallel array 106.

Continuing with reference to FIG. 4, at step 408 data arbitration logic is executed. For example, data arbitration logic can include performing normalization routines to format data for particular endpoint nodes 108 and routing data thereto (step 410). After one or more nodes 108 perform additional data processing, such as via software 118, data are routed back to NIC interface 104 in the form of responses (step 412). Thereafter, response arbitration is executed (step 414). For example, appropriate responses can be generated for respective computing devices 109 (step 416). Thereafter, the responses are transmitted via TX lines (step 418) and the process ends (step 420).

Thus, as shown and described herein, the present disclosure provides a new architecture that moves compute directly on to a network using a FPGA or other suitable circuit to interface with a parallel compute gride to reduce overall latency involving event responses to and from a network. An ultra-low latency in-line compute platform is provided that effectively supplants a traditional internal network as a function of an in-line and a localized parallel array comprising nodes that are situated physically close to the NIC interface. The backend can include a high bandwidth distribution plane to scale compute plane to multiple hosts within the server and/or racks. The present disclosure is particularly well suited for applications that require low latency responses or inference in network inference, in which real-time data processes include digitization and data flow through the inline compute network. Various use cases are supported, such as operations in a sensory network, radar systems, industrial processes, crystallization, medical imaging, DNA sequencing, real-time video capture and analysis involving imagery captured at very long focal lengths, plasma treatment processes such as etching or other surface treatments, or other applications (e.g., predictive applications) that require data to move at very high rates for accuracy.

Any of the features shown described herein may, in corresponding implementations, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:
1. An in-line network compute platform, comprising:
a circuit board configured to be installed in a computing device;
network interface controller configured on the circuit board, wherein the network interface controller includes at least one of a field programmable gate array ("FPGA") and an application specific integrated circuit ("ASIC"); and a deterministic compute engine configured on the circuit board, wherein the deterministic compute engine includes a parallel compute array of nodes, and further wherein each of the nodes includes a respective integrated circuit, wherein the network interface controller is configured to:

send data to a data communication network and receive data from a data communication network via a plurality of data pathways;

perform inspection of received data from the data communication network;

identify, as a function of the inspection, a respective node in the parallel compute array of nodes, to receive at least some of the received data; and parse, as a function of the respective node in the parallel compute array of nodes, the at least some of the received data;

normalize, as a function of the respective node in the parallel compute array of nodes, the parsed at least some of the received data; and route the normalized, parsed at least some of the received data to the respective node in the parallel compute array of nodes;

wherein each respective node in the parallel compute array of nodes is configured to:

perform data processing on at least some of the received data in accordance with at least one algorithm by the respective node in the parallel compute array of nodes executing programming instructions, thereby providing response data.

2. The in-line network compute platform of claim 1, wherein the network interface controller is further configured to:

receive, from the respective node in the parallel compute array of nodes, the response data;

perform inspection of the response data;

identify, as a function of the inspection of the response data, respective computing devices to receive at least some of the response data; and build, as a function of response arbitration data, responses for the respective computing devices, wherein the responses include at least some of the response data.

3. The in-line network compute platform of claim 2, wherein the network interface controller routes the responses to the respective computing devices via the data communication network.

4. The in-line network compute platform of claim 1, further comprising:

at least one replicator configured to replicate the data received from the data communication network.

5. The in-line network compute platform of claim 1, wherein at least some of the response data is forwarded to at least one other computing device.

6. The in-line compute platform of claim 1, further comprising:

at least one second in-line compute platform, wherein the in-line compute platform and the at least one second in-line compute platform are coupled via a chip-to-chip connection.

7. The in-line compute platform of claim 1, further comprising a first plurality of network ports configured for receiving some of the data for the in-line compute platform and a second plurality of network ports configured for receiving some other of the data for the at least one second in-line compute platform.

8. A data processing method including an in-line network compute platform, comprising:

receiving, by a network interface controller configured on a circuit board, wherein the network interface controller includes at least one of a field programmable gate array ("FPGA") and an application specific integrated circuit ("ASIC"), data from a data communication network;

performing inspection, by the network interface controller, of the received data;

identifying, by the network interface controller as a function of the inspection, a respective node in a parallel compute array of nodes, configured as a deterministic compute engine on the circuit board, to receive at least some of the received data, wherein the endpoint nodes are included in a parallel compute array;

parsing, by the network interface controller as a function of the respective node in the parallel compute array of nodes, the at least some of the received data;

normalizing, by the network interface controller as a function of the respective node in the parallel compute array of nodes endpoint nodes, the parsed at least some of the received data; and routing, by the network interface controller, the normalized, parsed at least some of the received data from the to the respective node in the parallel array of nodes.

9. The method of claim 8, further comprising:

receiving, by the network interface controller from the respective node in the parallel compute array of nodes, response data;

performing inspection, by the network interface controller, of the response data;

identifying, by the network interface controller as a function of the inspection of the response data, respective computing devices to receive at least some of the response data; and building, by the network interface controller as a function of response arbitration data, responses for the respective computing devices, wherein the responses include at least some of the response data.

10. The method of claim 9, further comprising:

routing, by the network interface controller, the responses to the respective computing devices.

11. The method of claim 8, further comprising:

replicating, by at least one replicator, the received data.

12. The method of claim 8, wherein the respective node in the parallel compute array of nodes is configured with programming instructions for data processing operations.

13. The method of claim 8, further comprising:

coupling, via a chip-to-chip connection, at least one second in-line compute platform to the in-line compute platform.

14. The method of claim 13, further comprising:

receiving, via a first plurality of network ports, some of the data for the in-line compute platform; and receiving, via a second plurality of network some other of the data for the at least one second in-line compute platform.

15. The method of claim 8, wherein the network interface controller is a field programmable gate array or a specialized smart network interface controller application specific integrated circuit.

16. The in-line compute platform of claim 1, wherein the data processing includes processes to structure data, change data, and create data events.

17. The in-line compute platform of claim 1, wherein the network interface controller is configured for parsing and structuring interaction with the network, including to handle protocol and data formats.

*   *   *   *   *